April 12, 1949.  R. E. J. NORDQUIST  2,466,731
LIQUID FILLING MACHINE WITH TRAVELING MEASURE
Original Filed Sept. 7, 1940  2 Sheets-Sheet 2
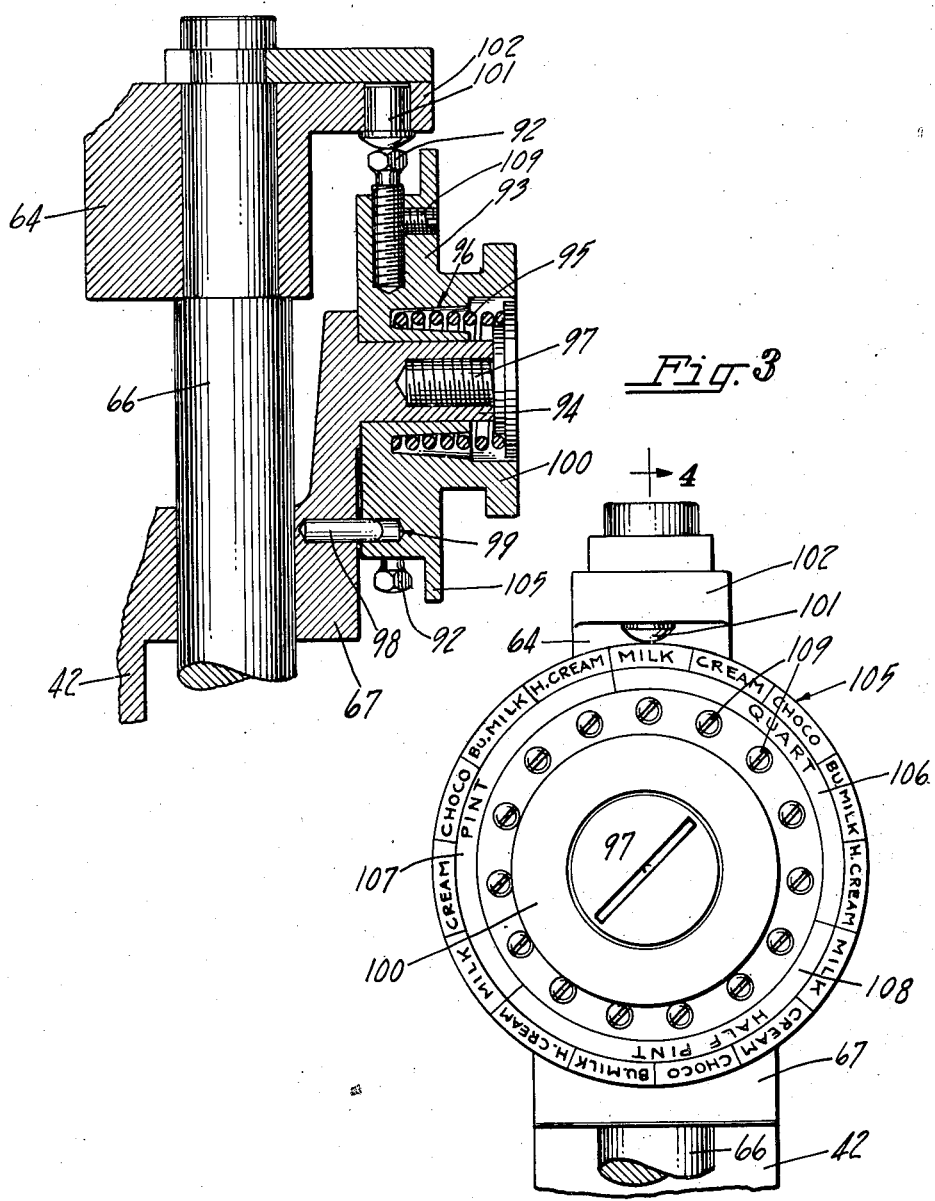
INVENTOR.
Ronald E. J. Nordquist
BY Ivan D. Thornburgh
Charles H. Ene
ATTORNEYS Patented Apr. 12, 1949

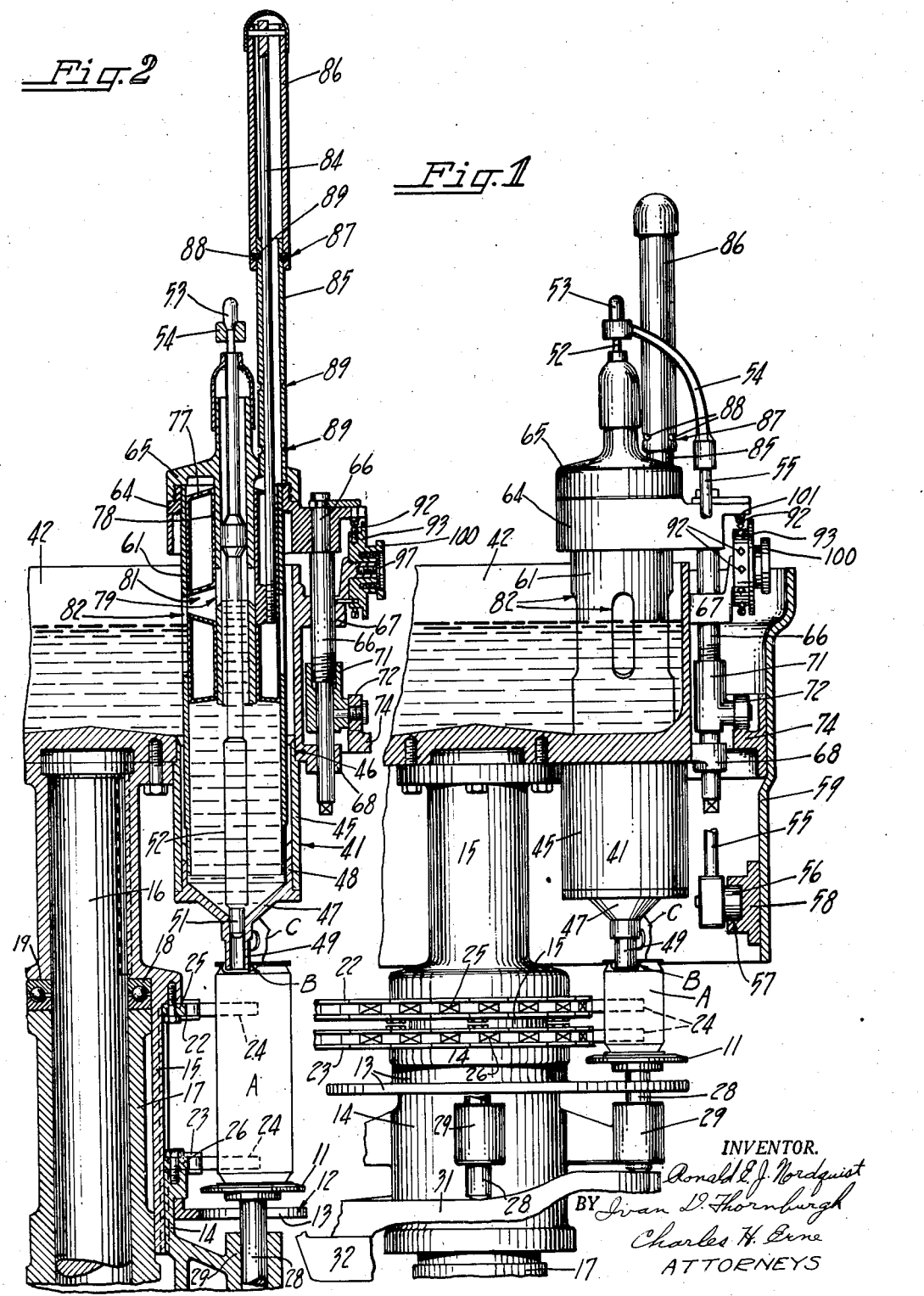

2,466,731

UNITED STATES PATENT OFFICE 2,466,731

LIQUID FILLING MACHINE WITH TRAVELING MEASURE

Ronald E. J. Nordquist, Maplewood, N. J., assignor to American Can Company, New York, N. Y., a corporation of New Jersey Original application September 7, 1940, Serial No. 355,845. Divided and this application December 21, 1944, Serial No. 569,240

11 Claims. (Cl. 226—102)

The present invention relates to a machine for filling liquids, such as milk and the like, into fibre containers and has particular reference to devices for accommodating the filling head or heads of such a machine to fill into containers of different dimensions, or for filling different volumes of the same liquid, or different liquids having different viscosities into containers of a given dimesion or holding capacity. This is a division of my parent United States patent application Serial Number 355,845, filed September 7, 1940, on Liquid filling machine, issued August 6, 1946, as Patent No. 2,405,232.

In recent years milk and milk products covering a wide range of varieties, such as ordinary milk, chocolate milk, buttermilk, cream, heavy cream, etc., have been packaged in fibre containers. In order to meet the demands of the trade these products are packed in different sizes of containers which include half-pint, pint, quart and the like containers.

Nearly all dairies handle this wide variety of milk products and containers. The filling of the containers is usually done by machinery so that accurate measurement and speed in filling may be obtained.

However, such a wide range of milk products and container sizes makes necessary considerable machinery which only the larger dairies can afford to use. In the smaller dairies considerable of the individual machines for the individual sizes of containers would be idle most of the time, if such multitudinous machines were installed, because of the relatively small quantities of the individual products packed. Hence the smaller dairies must sometimes forego the use of filling machinery and are to that extent at a disadvantage in competing with the larger dairies.

The instant invention contemplates overcoming this difficulty by providing, in a filling machine, devices which make it easy to rapidly change over from one kind of milk to another and from one size of container to another so that the entire range of milk products and containers may be used in the same machine, thereby giving the smaller dairies in one machine the benefit of the more expensive varied machinery used by large dairies.

An object of the invention is the provision in a liquid filling machine of devices wherein control may be had over the measuring and filling of liquids in volumes corresponding to the volume of the container to receive the liquid.

Another object is the provision of such devices wherein control may be had over the volume of the liquid measured in respect to its viscosity so that different kinds of liquids may be accurately measured and filled into the containers.

Numerous other objects and advantages of the invention will be apparent as it is better understood from the following description, which, taken in connection with the accompanying drawings, discloses a preferred embodiment thereof.

Referring to the drawings:

Figure 1 is a part elevation and part vertical sectional view of the filling head portion of a machine embodying the instant invention, with parts broken away;

Fig. 2 is a radial vertical section of the portion of the machine shown in Fig. 1, certain movable parts of the machine being illustrated in a different position to accommodate a larger size container, with parts broken away;

Fig. 3 is an enlarged detail of a dial shown at the upper right of Fig. 1, with parts broken away; and Fig. 4 is a sectional view taken substantially along the line 4—4 in Fig. 3.

As a preferred embodiment of the instant invention the drawings illustrate the filling head portion of a machine for filling milk products into square fibre containers of the character disclosed in United States Patent 2,085,979, issued July 6, 1937, to J. M. Hothersall, on Container. Such a container, designated by the letter A in Figs. 1 and 2, is formed with a filling and dispensing opening B located in the top of the container. When the container is filled the opening B is closed and sealed with a plug closure element C which is hingedly connected to the container top adjacent the opening.

Upon entering the machine the containers A are in upright position, with their filling openings B uncovered or open and with the closure elements C standing upright adjacent the openings. The containers enter in a continuous procession and are individually separated from the processional line and are advanced through the machine in timed order. During this advancement each container is filled, its closure element C is pressed down into the filling opening B to close and seal it, and the container is then discharged from the machine to any suitable place of deposit.

At the filling station of the machine a container A to be filled is received on a vertically movable lifter pad 11 (Figs. 1 and 2). There are a plurality of these lifter pads arranged in a circle and disposed in openings 12 formed in a rotatable disc 13 secured to a hub 14 slidably mounted on the lower portion of a stepped or shouldered rotatable sleeve 15. The hub is keyed onto the sleeve so that it will rotate with it and is slidable on the sleeve to adjust the lifter pad for different heights of containers.

The upper portion of the sleeve 15 is mounted on and is keyed to a vertical drive shaft 16 which may be rotated in any suitable manner. The shaft is journalled in a vertical bearing 17 constituting a column which may be a part of the main frame of the machine and which is disposed inside the lower portion of the sleeve. A ball bearing 18 mounted on the drive shaft and interposed between the top of the bearing 17 and a shoulder seat 19 in the upper portion of the sleeve, carries the weight of the sleeve and hub parts rotated by the shaft.

Conveyors 22, 23, which may be of the endless chain type, having prongs or container propelling dogs 24, operate over sprockets 25, 26 mounted on the sleeve 15 and the hub 14 and thus rotate with these parts for placing the containers onto the lifter pads and for removing them from the pads. With this arrangement of conveyors they may be relatively shifted or adjusted vertically in respect to one another as shown in Figs. 1 and 2 to accommodate containers of different heights. For this purpose the lower chain conveyor 23 with its sprocket 26 and hub 14 is vertically slidably adjustable on sleeve 15, relative to the upper conveyor 22 which is fixed on the sleeve, in a manner clearly disclosed in my aforesaid identified parent issued patent.

Each lifter pad 11 is formed on the upper end of a vertical stem 28 carried in a bearing lug 29 formed on the hub 14. The lower ends of the stems 28 ride on a ring cam 31 secured to a table portion 32 of the main frame.

The lifter pad hub 14 and the parts connected therewith are rotated intermittently and during their rotation, the stems 28 of the lifter pads 11 traverse the cam 31 and thus raise the lifter pads and the containers thereon into filling position (shown in Figs. 1 and 2).

Filling of the milk contents into the raised container A while it is on its lifter pad 11 is preferably carried out by way of a filling head 41 which is disposed above the container. This filling head is of the character disclosed in United States Patent 2,144,628, issued to John M. Hothersall, on Filling machine. There are a plurality of these filling heads, one for each lifter pad 11 and they extend down from the bottom of a milk reservoir 42 which is secured to the top of and which rotates intermittently with the vertical sleeve 15 on the drive shaft 16.

Each filling head 41 includes a tubular member 45 (Fig. 2) which is secured in an opening 46 in the bottom of the tank 42. The lower end of the member is closed by a funnel shaped cap 47 having a vertical rim 48 which extends up inside the member. The cap is formed with a depending cylindrical nozzle 49 which extends into the dispensing opening B in the container A when it is lifted into filling position by its lifter pad 11, as hereinbefore explained.

Delivery of the milk from the nozzle 49 is controlled by a valve mechanism which includes a valve plunger 51 normally disposed within the nozzle, as shown in Fig. 2. The valve plunger is formed on a vertical valve stem 52 which extends up above the top of the tank. The upper end of the stem is fastened, by way of a universal joint 53, to an arm 54 (Fig. 1) formed on the upper end of a vertical actuating rod 55 which is located outside the tank. This actuating rod is carried in suitable bearings which are formed in the outside of the tank 42.

The lower end of the actuating rod 55 carries a cam roller 56 which operates in a cam groove 57 of a stationary ring cam 58 secured to the inside of a shield 59 which extends around the filling mechanism. The shield is preferably supported on suitable brackets secured to the machine frame. Thus as the filling head travels around the column 17 the cam roller traverses the cam groove 57 and this raises and lowers the valve stem 52 and the attached valve plunger 51 of each head in time with the other moving parts of the machine.

Before the nozzle valve is opened, a predetermined charge of milk in the tank 42 is measured out by a cylindrical measuring element 61 which is located in the filling head 41. The measuring element surrounds the valve stem 52 and extends down into the tubular member 45. The element is preferably straight and is open at both ends. The lower end of the element fits snugly within the rim 48 of the head cap 47.

The upper end of the measuring element 61 is secured in a movable bracket 64 which is provided with a screw cap 65. The bracket is mounted on a vertical rod 66 located outside the tank 42. The rod is carried in a pair of spaced bearing lugs 67, 68 formed on the outside of the tank. Between the bearings a collar 71 is threaded on the rod 66 and this collar carries a cam roller 72 which operates on a ring cam 74 secured to the inside of the shield 59.

Thus as the filling head 41 rotates around the column 17 inside the shield 59, the cam roller 72 traverses the cam track of the cam 74. During its rotation around the column and prior to the opening of the valve 51, the cam 74 raises the measuring element 61 within the head so that the lower end of the element is above the rim 48 of the head cap 47. This action permits the milk in the tank 42 to enter into the measuring element and fill it to the level of the milk in the tank. The measuring element then moves down into its original position with its lower end inside the rim 48 and this isolates the milk within the measuring element from the milk within the tank.

The specific volume in liquid measure confined within the measuring element 61 is controlled by a measuring member or block 77 which fits snugly within the upper portion of the measuring element. This block surrounds a vertical tube 78 formed integrally with the cap 65 and extends down into the measuring element below the level of the milk in the tank 42. The tube is formed with a pair of oppositely disposed slots 79 which are located a predetermined distance above the milk level in the tank.

Hence when the measuring element 61 is in an upper open position to permit the milk to flow into its open lower end from the filling head 41, the milk level rises up into contact with the bottom of the measuring block 77 and also rises in the tube 78 to the level of the milk in the tank. When the measuring element is thereafter moved downwardly relative to the filling head 41 into its closed position illustrated in Fig. 2, the block 77 compresses the milk in the measuring element and thus forces the milk further up into the tube 78 above the milk level in the tank, thereby causing some of the milk to overflow out of the tube slots 79. This milk flows out of openings 81 in the block and thence through slots 82 in the measuring element 61 and is thus returned to the tank. This distance the measuring element 61 moves vertically to open and closed positions in the filling head 41 relative to the vertically adjusted block 77 therein, is not sufficient to shut off communication for the described purpose between the adjacent tube slots 79, block openings 81 and measuring element slots 82, as will be evident from Figs. 1 and 2 wherein the measuring element 1 is illustrated in its lowermost closed position in filling head 41 and its inner cap ring 48. When the measuring element comes to rest in its lowermost position the quantity of milk confined within the measuring element up to the level in the tube 78, this being at the liquid level at the bottom edge of the slots 79, is a predetermined measured quantity which is the exact amount to be filled into a predetermined size container A when the valve 51 in the nozzle 49 is opened.

Fig. 2 of the drawing shows the measuring block 77 in position for measuring one quart liquid measure for the quart size container A shown on the lifter pad 11. For other sizes of containers such as the pint or the half-pint, (the latter shown in Fig. 1) the measuring block is adapted to be manually shifted down into the measuring element to its proper position for confining the desired quantities of milk within the measuring element.

For such a purpose the measuring block 77 is carried on a vertical rod 84 which extends up through one side of the block and up through a support tube 85 secured in the cap 65 in an off-center position. The rod extends above the support tube and is secured to a sleeve 86 which surrounds the tube. Near its bottom end the sleeve is formed with a pair of slots 87 which are adapted to accommodate a removable spring hair pin 88. This hair pin extends through the slots and engages into notches 89 formed in the outer surface of the tube 85.

There are three notches 89, an upper notch for the quart size container, an intermediate notch for the pint size container and a lower notch for the half-pint size container. Thus by removing the hair pin and sliding the sleeve 8 up or down on the tube 85 to bring the sleeve slots 87 into line with the proper notch 89 and by reinserting the pin, the block 77 may be positioned in the proper place to accommodate a desired container as to the required volume of fill.

When the measuring block 77 is adjusted for either the pint size container or for the half-pint size as will be seen from the position of the notches 89 in Fig. 2, the top of the block will be below the tube slots 79. Hence when the measuring takes place for a pint size container, milk or other liquid discharging from these slots will flow down over the top of the block and fall into the milk in the tank 42. In the case of the half-pint size container the top of the block will be below the level of the milk in the tank. Hence while being measured for this size container milk discharging from the slots 79 will fall directly into the milk in the tank. In both of these cases the openings 81 in the measuring block will be in a closed off position below the slots 82 in the measuring element 61 and therefore will not be used. These openings 81 are not necessary for the pint and half-pint sizes of containers since discharged milk flows out over the top of the block.

Since the machine is adapted for use also with different kinds of milk or liquids of varying viscosity, provision is made for a fine adjustment of the measuring element to insure accuracy of fill. Liquids such as cream, chocolate milk, buttermilk and heavy cream are of heavier consistency than ordinary milk and hence a slightly greater quantity adheres to the measuring elements when the liquid is drained from them and it is for this purpose that the measuring element is set slightly different for each kind of milk. This setting insures that the exact liquid measure of the liquid is filled into the container.

The exact setting is made possible by a plurality of adjustable stop elements or setscrews 92 (Fig. 4) which are threaded in radial position in a rotatable dial wheel 93 carried on a pivot stud or trunnion 94 formed on the bracket lug 67 of the tank 42. The wheel is frictionally under pressure of a compression spring 95 disposed within a recess 96 formed in the wheel. The spring is held in place by a large headed screw 97 which is threaded in the outer end of the pivot stud. The wheel is removably locked against movement by a pin 98 which is secured in the bearing lug 67 and which extends into a hole or aperture 99 formed in the dial wheel. There are a plurality of these holes, one adjacent each setscrew 92.

Hence by pulling the dial wheel outwardly against the pressure of its spring 95 the pin 98 may be disengaged from its hole 99 and the wheel thereupon may be rotated to any desired setting and reset in locked position (that is, with the pin 98 in the desired hole 99) for operation under the control of the proper setscrew. A collar or handle element 100 is formed on the dial wheel for pulling the wheel out and for rotating it on its trunnion. Thus when the measuring element 61 moves down into measuring position a pin 101 in a lug 102 formed on the measuring element bracket 64, engages the positioned setscrew 92 and thereby stops the measuring element in the proper vertical position for the exact desired liquid measure dependent upon the viscosity of the liquid, into a given size container.

There is one of these setscrews 92 for each kind of milk above mentioned and one for each size of container. In order to identify the screws a dial 105 is formed on the wheel 93 and this dial is marked and divided into three sections according to size of container, namely, a quart section 106, a pint section 107, and a half-pint section 108. Each section is sub-divided under the marked headings, Milk, Cream, Choco for chocolate milk, Bu. for buttermilk, and H cream for heavy cream and there is a setscrew 92 adjacent each of these headings. Each screw for each grade of milk and container is preferably initially set by trial and experiment and afterwards is locked against movement by a setscrew 109, each of which is threaded into the wheel at an angle to its respective adjustable screw 92.

After a container A has been filled with its contents the lifter pad 11 on which it is supported is lowered to the level of the lifter pad disc 13 as hereinbefore mentioned and is ready for sealing and discharge from the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for filling liquids of different viscosities into containers, the combination of a filling head for holding a filling fluid, a liquid measuring element located in said filling head and movable into and out of sealing engagement therewith, means for moving said measuring element out of sealing engagement with said head to receive an amount of liquid therefrom, said moving means thereafter moving said element towards and into sealing engagement with said head to segregate and confine said received liquid within said element while returning excess liquid to said head, and a plurality of stop elements carried by said head and movable into the path of travel of said measuring element, said stop elements being adopted to be set in accordance with the viscosity of a particular liquid to accurately limit the travel of the measuring element toward the filling head so that an accurately measured charge based on the viscosity of the liquid being filled will be confined in the measuring element preparatory to filling said charge into a container.

2. In a machine for filling liquids of different viscosities into containers, the combination of a filling head for holding a filling liquid, a liquid measuring element located in said filling head and movable therein to segregate and confine a predetermined amount of the liquid, means for moving said measuring element relative to said head, a rotatable dial adjacent said measuring element, said dial being divided into segments representing different sizes of containers and each segment being subdivided into a plurality of zones designating kinds of liquid to be filled into the containers, a stop element carried by said head and disposed adjacent each subdivision on the dial, said dial being adapted to be rotated into position adjacent the measuring element for a corresponding kind of liquid in said filling head to accurately limit the movement of said measuring element and thereby confine therewithin a predetermined charge of liquid as determined by its viscosity preparatory to filling said charge into a container.

3. In a machine for filling liquids of different viscosities into containers, the combination of a filling head for holding a filling fluid, a liquid measuring element located in said filling head and movable into and out of sealing engagement therewith, means for moving said measuring element out of sealing engagement with said head to receive an amount of liquid therefrom in excess of a predetermined filling charge, said moving means thereafter moving said element towards and into sealing engagement with said head to segregate and confine said received liquid within said element while returning excess liquid to said head, a plurality of stop elements carried by said head and movable into the path of travel of said measuring element, said stop elements being adapted to be selectively positioned in accordance with the viscosity of a particular liquid to accurately limit the travel of the measuring element toward the filling head so that an accurately measured charge based on the viscosity of the liquid being filled will be confined relative to the head preparatory to filling said charge into a container, and means for bringing a container into filling position to receive said measured charge of liquid.

4. In a machine for filling liquids of different viscosities into containers of different sizes, the combination of a filling head for holding a filling liquid, a liquid measuring element located in said filling head and movable therein to segregate and confine a predetermined amount of the liquid received therefrom, means carried by said element and movable relative thereto for varying the volume of liquid received therein in accordance with the size of container to be filled, means for moving said measuring element relative to said head, a rotatable dial disposed adjacent said measuring element, said dial being divided into segments representing different sizes of containers and each segment being subdivided into zones designating kinds of liquid to be filled into the containers, a stop element disposed adjacent each subdivision on the dial, said dial being adapted to be rotated into position adjacent the measuring element for a corresponding kind of liquid in said filling head to accurately limit the movement of said measuring element and thereby confine within it a predetermined charge of liquid in respect to its viscosity preparatory to filling said charge into a container, and means below said filling head for receiving and supporting a container to be filled, said means being vertically movable into different predetermined fixed positions to accommodate the different sizes of containers specified on said dial.

5. In a machine for filling liquids of different viscosities into containers, the combination of a filling head for holding a filling liquid, a liquid measuring element located in said filling head and moveable therein to segregate and confine a predetermined amount of the liquid, means for moving said measuring element relative to said head, a rotatable dial disposed adjacent said measuring element, a plurality of stop elements on said dial for variable setting in accordance with the viscosity of a particular liquid being filled to accurately limit the travel of the measuring element toward the filling head so that an accurately measured charge based on the viscosity of the liquid will be confined in the head preparatory to filling said charge into a container, a trunnion disposed adjacent said measuring element for supporting said dial, a yieldable connection between said dial and said trunnion for holding said dial in operative position, and a collar on said dial for sliding said dial on its trunnion to shift said stop elements out of the path of travel of said measuring element and for rotating said dial when so shifted to bring a different stop element into alignment with said measuring element.

6. In a machine for filling liquids of different viscosities into containers, the combination of a filling head for holding a filling liquid, a liquid measuring element located in said filling head and movable therein to segregate and confine a predetermined amount of liquid, means for moving said measuring element relative to said head, a rotatable dial mounted adjacent said measuring element, a plurality of stop elements on said dial for variable setting in accordance with the viscosity of a particular liquid to accurately limit the travel of the measuring element toward the filling head so that an accurately measured charge based on the viscosity of the liquid being filled will be confined in said element by the head preparatory to filling said charge into a container, a trunnion disposed adjacent said measuring element for supporting said dial, a compression spring between said dial and said trunnion for holding said dial in operative position, a collar on said dial for sliding said dial on its trunnion to shift said stop elements out of and into the path of travel of said measuring element and for rotating said dial when in an out position to bring a different stop element into alignment with said measuring element, and means for locking said dial against movement when in an adjusted position.

7. In a machine for filling liquids of different viscosities into containers, the combination of a filling head for holding a filling liquid, a liquid measuring element located in said filling head and movable therein to segregate and confine a predetermined amount of the liquid, means for moving said measuring element relative to said head, a rotatable dial disposed adjacent said measuring element, said dial having a plurality of locking holes formed in an inner surface thereof in spaced relation around said dial, a stationary pin adjacent said measuring element and insertable into said holes selectively for locking said dial in a predetermined position, a plurality of stop elements on said dial and arranged one adjacent each locking hole and set in accordance with the viscosity of a particular liquid to accurately limit the travel of the measuring element toward the filling head so that an accurately measured charge based on the viscosity of the liquid being filled will be confined in the head preparatory to filling said charge into a container, a trunnion disposed adjacent said measuring element for supporting said dial, a compression spring between said dial and said trunnion for holding said dial in operative position, a collar on said dial for sliding said dial on its trunnion to shift said stop elements out of and into the path of travel of said measuring element and for rotating said dial when in an out position to bring a different stop element into alignment with said measuring element, and means for locking said dial in an adjusted position against turning.

8. In a machine for filling liquids of different viscosities into containers, the combination of a filling head for holding a filling liquid, a liquid measuring element located in said filling head and movable therein to segregate and confine a predetermined amount of the liquid, means for moving said measuring element relative to said head, a rotatable dial carried by said head adjacent said measuring element, said dial being divided into segments representing different sizes of containers with each segment subdivided into zones designating kinds of liquid to be filled into the containers, a plurality of setscrew stop elements carried by said dial adjacent each subdivision thereof for variable setting in accordance with the viscosity of a particular liquid indicated on said dial and adapted to be rotated therewith into position adjacent the measuring element for the corresponding kind of liquid contained in said filling head to accurately limit the movement of said measuring element and thereby confine within it a predetermined charge of liquid in respect to its viscosity preparatory to filling said charge into a container, and means carried by said dial for locking said stop elements in their set position against turning out of adjustment.

9. In a machine for filling liquids of different viscosities into containers of different sizes, the combination of a filling head for holding a filling fluid, a liquid measuring element located in said filling head and movable into and out of sealing engagement therewith, means for moving said measuring element away from and out of sealing engagement with said head to receive an amount of liquid therefrom in excess of a predetermined filling charge and then for moving said element towards and into sealing engagement with said head to segregate and confine said received liquid within said element while returning excess liquid to said head, a measuring block disposed within said measuring element for limiting the volume of liquid confined within said measuring element to the specific volume in liquid measure of the container to be filled, and a plurality of stop elements supported by said head and movable into the path of travel of said measuring element, said stop elements being adapted to be selectively positioned in accordance with the viscosity of a particular liquid to accurately limit the travel of the measuring element toward the filling head so that an accurately measured charge based on the viscosity of the liquid and the volume in liquid measure being filled will be confined by the head preparatory to filling said charge into a container.

10. A machine for filling liquids into containers of different sizes, comprising a rotatable tank having a communicating filling head for holding the liquid, a tubular measuring element movably mounted in said filling head for segregating and confining a predetermined amount of the liquid received therefrom, means for moving said measuring element relative to said head to receive liquid therefrom, a measuring member carried by said measuring element and movable relative thereto for changing the capacity of said element to vary the volume of liquid received therein in accordance with the size of container to be filled, and cooperating liquid communicating means in said measuring element and member respectively for returning an excess of measured liquid to said tank when said measuring element is moved towards said filling head to confine and segregate a measured amount of liquid in the measuring element.

11. A machine for filling liquids into containers of different sizes, comprising a rotatable tank having a communicating filling head for holding the liquid, a measuring cylinder movably mounted in said filling head for segregating and confining a predetermined amount of the liquid received therefrom, means for moving said measuring cylinder in opposite directions relative to said head to receive and confine the tank liquid, a measuring block slidably mounted in said measuring cylinder for changing the capacity of the cylinder to vary the volume of liquid received therein in accordance with the size of container to be filled, and communicating ports in said measuring cylinder and block respectively for returning surplus liquid from said cylinder to said tank when the cylinder is moved towards said head to confine a measured volume of tank liquid therein.

RONALD E. J. NORDQUIST.

REFERENCES CITED

The following references are of record in the file of this patent:

UNITED STATES PATENTS

| Number | Name | Date |
| --- | --- | --- |
| 1,036,778 | Baker | Aug. 27, 1912 |
| 1,633,046 | Thomson | June 21, 1927 |
| 2,029,299 | Anderson | Feb. 4, 1936 |
| 2,103,158 | Kantor | Dec. 21, 1937 |
| 2,136,901 | Ferguson | Nov. 15, 1938 |
| 2,144,628 | Hothersall | Jan. 24, 1939 |
| 2,174,420 | Kantor | Sept. 26, 1939 |

FOREIGN PATENTS

| Number | Country | Date |
| --- | --- | --- |
| 13,759 | Great Britain | Sept. 1, 1894 |